(12) United States Patent
Hofschulte (10) Patent No.: US 8,783,422 B2
(45) Date of Patent: Jul. 22, 2014

(54) DRIVE FOR ACTUATING A PARKING BRAKE

(75) Inventor: Wolfram-Heinrich Hofschulte, Bonndorf (DE)

(73) Assignee: IMS Gear GmbH, Donaueschingen (DE)

( * ) Notice: Subject to any disclaimer, the term of this patent is extended or adjusted under 35 U.S.C. 154(b) by 44 days.

(21) Appl. No.: 13/522,268

(22) PCT Filed: Jan. 12, 2011

(86) PCT No.: PCT/EP2011/000099
§ 371 (c)(1),
(2), (4) Date: Sep. 17, 2012

(87) PCT Pub. No.: WO2011/085971
PCT Pub. Date: Jul. 21, 2011

(65) Prior Publication Data
US 2013/0192935 A1    Aug. 1, 2013

(30) Foreign Application Priority Data
Jan. 13, 2010   (DE) .......................... 10 2010 004 602

(51) Int. Cl.
| F16D 65/34 | (2006.01) |
| F16D 65/00 | (2006.01) |
| B60T 13/02 | (2006.01) |
| B60T 13/74 | (2006.01) |
| F16D 65/18 | (2006.01) |
| B60T 7/10  | (2006.01) |
| F16D 125/24 | (2012.01) |
| F16D 121/24 | (2012.01) |
| F16D 125/52 | (2012.01) |
| F16D 125/22 | (2012.01) |

(52) U.S. Cl.
CPC ............ *F16D 65/18* (2013.01); *F16D 2125/24* (2013.01); *F16D 65/0075* (2013.01); *B60T 13/02* (2013.01); *F16D 2121/24* (2013.01); *B60T 13/741* (2013.01); *F16D 2125/52* (2013.01); *B60T 7/107* (2013.01); *F16D 2125/22* (2013.01); *B60T 13/746* (2013.01)
USPC ........................................ 188/72.1; 188/72.2

(58) Field of Classification Search
USPC .............. 188/72.1, 72.2, 72.7–72.9, 158–162
See application file for complete search history.

(56) References Cited

U.S. PATENT DOCUMENTS 3,455,418 A * 7/1969 Littmann ....................... 188/162
6,412,608 B1 * 7/2002 Mohr et al. .................. 188/72.9
(Continued)

FOREIGN PATENT DOCUMENTS

| DE | 19913497 | 9/2000 |
| DE | 10308886 | 4/2004 |

(Continued)

OTHER PUBLICATIONS

DE 10 2010 004 602.7, Office Action dated Aug. 25, 2010, 3 pages—German, 1 page—English.

*Primary Examiner* — Christopher Schwartz
(74) *Attorney, Agent, or Firm* — Andrew F. Young, Esq.; Lackenbach Siegel, LLP (57) ABSTRACT

A system for a drive for actuating a parking brake operably involves a brake caliper. The brake caliper has at least one brake piston with a brake piston axis, the piston being actuatable by means of an operably actuating lever with a rotational center. An electric motor is fixed to the brake caliper and mechanically coupled to the actuating lever with the output shaft that exits the electric motor.

30 Claims, 10 Drawing Sheets

(56) References Cited

U.S. PATENT DOCUMENTS

| | | | |
|---|---|---|---|
| 7,021,415 B2* | 4/2006 | Farmer et al. | 180/275 |
| 7,958,974 B2* | 6/2011 | Baumgartner et al. | 188/72.2 |
| 7,987,951 B2* | 8/2011 | Raz | 188/72.1 |
| 2007/0045060 A1* | 3/2007 | Pettersson | 188/72.1 |
| 2008/0217117 A1* | 9/2008 | Severinsson et al. | 188/72.1 |
| 2009/0045018 A1* | 2/2009 | Baumgartner et al. | 188/72.2 |

FOREIGN PATENT DOCUMENTS

| | | |
|---|---|---|
| DE | 102006056346 | 6/2007 |
| DE | 102006010483 | 9/2007 |
| WO | WO 98/06608 | 2/1998 |

* cited by examiner

DRIVE FOR ACTUATING A PARKING BRAKE

CROSS REFERENCE TO RELATED APPLICATIONS

This application claims priority from International Ser. No. PCT/EP2011/000099 filed 12 Jan. 2011, the entire contents of which are incorporated herein by reference, which in turn claims priority from German Ser. No.: DE 10 2010 004 602.7 filed 13 Jan. 2010.

FIGURE FOR PUBLICATION

FIG. 3

BACKGROUND OF THE INVENTION

1. Field of the Invention

The present invention relates to a drive for actuating a parking brake. More particularly, the present invention relates to drive for actuating a parking brake operably involving a brake piston being actuatable by an actuating lever with a rotational center.

2. Description of the Related Art

A brake caliper customarily comprises at least one brake disk, at least one brake lining and at least one brake piston. The brake piston presses the brake lining axially and at a right angle against the brake disk. When the driver actuates a known parking brake integrated in the brake caliper a force is applied by a hand brake lever and a Bowden wire fastened to it on the purely mechanical brake caliper. A linear introduction of force is converted into a torque in order to rotate an actuation lever. Finally, the torque must be converted back into a linear introduction of force that presses the brake lining against a brake disk.

In such brake calipers with actuation lever the actuation lever is rotatably fastened in an area of the distal end of the brake piston to a housing around its cup axis. The cup axis is aligned either vertically or transversely, in particular at a right angle, to the axis of the brake piston. A transfer of force takes place in the cup as a function of the cup axis. A vertical arrangement, for example, requires a transfer of force from the lever via an eccentric arranged, e.g., in the cup to the brake piston. The design of the transfer of force from the lever onto the brake piston will not be discussed in detail here.

In addition, hydraulic vehicle breaks have become known in the meantime from DE 197 32 168 C2 (the entire contents of which are incorporated by reference) that realize the above-described function of a parking brake electromechanically. To this end an electromotor is arranged laterally adjacent to a vehicle brake housing. An output shaft of the electromotor runs here with lateral distance parallel to a central axis of a brake piston for the forwarding of force. The output shaft exits from the electromotor on the side facing away from the brake piston. A stepdown gearing acts between the electromotor and the brake piston.

Considering the known vehicle brakes, there is still a problem of providing a brake caliper with an integrated parking brake that is actuated in a conventional manner with a Bowden wire without having to make a basic change to the brake caliper and without considerably more construction space being required. A solution of the problem should be able to be used to the extent possible in all variants of brake calipers.

It is therefore proposed that at least one of the concerns noted is addressed by the proposed electromechanical worm-spindle drive for an actuating parking brake.

ASPECTS AND SUMMARY OF THE INVENTION

The present invention proposes a system involving a drive for actuating a parking brake in a brake caliper. The brake caliper has at least one brake piston with a brake piston axis, the piston being actuatable by means of an operable actuating lever with a rotational center. An electric motor is operably fixed to the brake caliper and mechanically coupled to the actuating lever with the output shaft that exits the electric motor.

In one aspect of the proposed invention there is a drive, for actuating a parking brake in a brake caliper, comprising: at least one brake caliper, further comprising: at least one brake piston operable along a brake piston axis positioned on an actuation side, the brake piston operably engaging an actuation lever having a respective center of rotation, an electromotor having an output shaft providing motive rotational force fixably secured with the brake caliper, and the output shaft being operably coupled to the actuation lever, whereby operating the actuation lever operates the brake piston.

According to another aspect of the proposed invention there is further provided a drive, wherein: the electromotor is fixably secured on an outside of the brake caliper.

According to another aspect of the proposed invention there is further provided a drive, further comprising: a motor axis along the output shaft, and the motor axis being aligned transversly to the brake piston axis.

According to another aspect of the proposed invention there is further provided a drive, wherein: the motor axis is aligned at one of perpendicular to the brake piston axis and parallel with the brake piston axis.

According to another aspect of the proposed invention there is further provided a drive, wherein: the electromotor further comprises: a worm element on the output shaft, and the worm element operably coupled to the brake piston during a use thereof.

According to another aspect of the proposed invention there is further provided a drive, wherein: the exiting output shaft of electromotor is arranged facing the brake position.

According to another aspect of the proposed invention there is further provided a drive, wherein: the center of rotation of the actuation lever lies on the motor axis.

According to another aspect of the proposed invention there is further provided a drive, wherein: the output shaft and the drive worm rotate cooperatively during a use of the drive along a worm-spindle transmission, the worm-spindle transmission having a spindle, the spindle aligned along the a spindle axis and operably coupled to the actuation lever during the use, and the spindle axis arranged opposing the motor axis.

According to another aspect of the proposed invention there is further provided a drive, further comprising: an oblong hole defined on a distal end of the actuation lever, the oblong hole extending along a direction toward an operable center of rotation of the actuation lever, and the spindle operably engaging the oblong hole in a pivotable manner, whereby during the use the actuation lever is pivotable about the center of rotation.

According to another aspect of the proposed invention there is further provided a drive, further comprising: a toothed segment on a distal end of the actuation lever.

According to another aspect of the proposed invention there is further provided a drive, wherein: the toothed segment is arrayed facing away from the center of rotation of the actuation lever, and the toothed segment is arrayed convexly away from the center of rotation.

According to another aspect of the proposed invention there is further provided a drive, wherein: the toothed segment operatively cooperates with the spindle, and the toothed segment operatively cooperates with spindle through at least one of a toothed rack and a worm element.

According to another aspect of the proposed invention there is further provided a drive, wherein: the actuation lever operably engages with a spindle nut, the spindle nut operably interengaging the rotating spindle in such a manner allowing the spindle nut to rotate un unison with the rotation spindle, and the spindle driven by the electromotor.

The above, and other aspects, features and advantages of the present invention will become apparent from the following description read in conduction with the accompanying drawings, in which like reference numerals designate the same elements.

DETAILED DESCRIPTION OF THE PREFERRED EMBODIMENTS

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional tuns should not be construed to limit the scope of the invention in any manner. The words "connect," "couple," and "operable" and similar terms with their inflectional morphemes do not necessarily denote direct and immediate connections, but also include connections through mediate elements or devices.

FIGS. 1 to 3 and 7 to 9 show a first type of a brake caliper 10. This type has a housing 20 aligned parallel to a brake piston axis A of a brake piston 11 not shown in detail. As shaft with a center of rotation 42 exits from the housing 20 along the brake piston axis A facing away from the brake piston. The shaft can be rotated by an actuation lever 40 about the center of rotation 42.

A rotation of the shaft brings about a linear movement of the brake piston not visible in the drawings and seated in the housing, as a result of which a brake lining which is also not visible is pressed against a brake disk which is not visible in the drawings.

Figure 3:
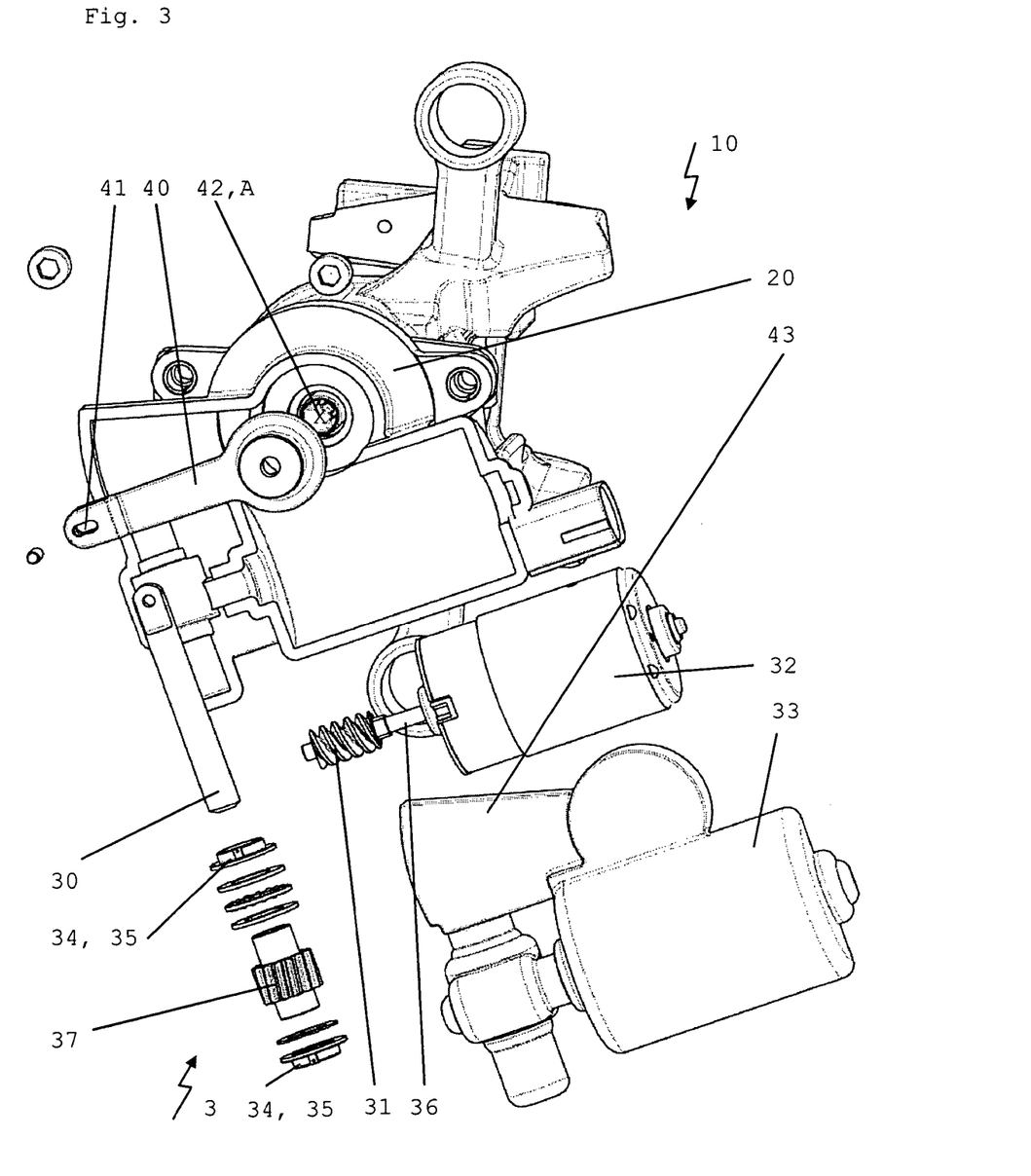
FIG. 3 shows a perspective view of the first brake caliper type with the actuation device and the drive from FIG. 1, whereby a worm-spindle transmission connected between the actuation device and the drive is shown in an exploded view.
Figure 4:
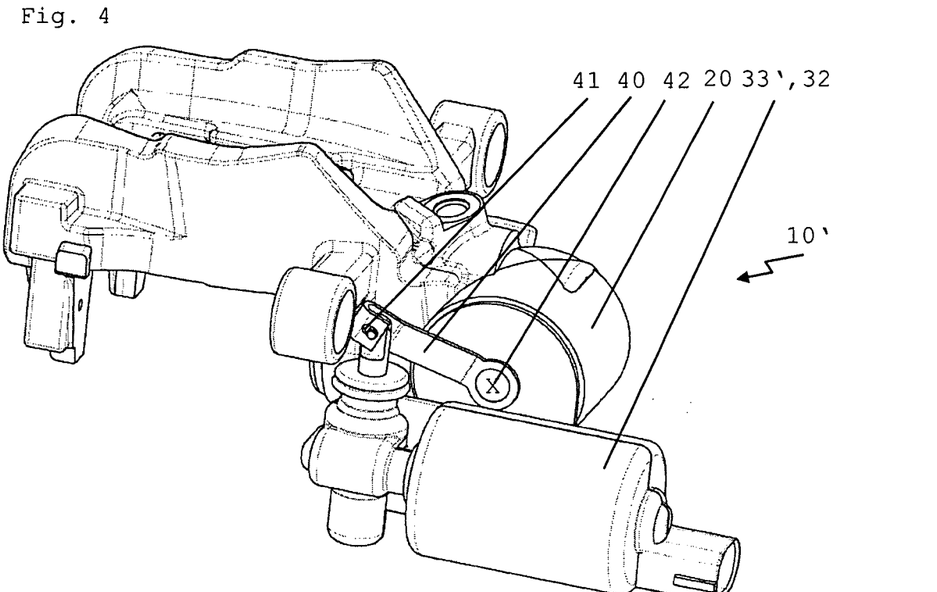
FIG. 4 shows a perspective view of a second brake caliper type with an actuation device in a deviating alignment and with a drive in accordance with the first exemplary embodiment and closed in another housing.
Figure 5:
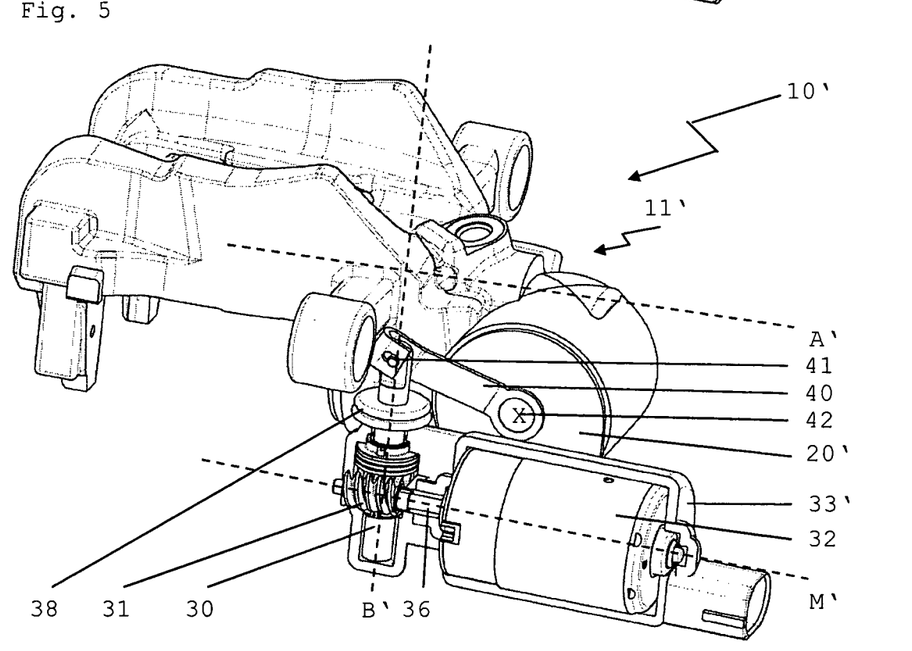
FIG. 5 shows a perspective view of the second brake caliper type with the actuation device and the drive from FIG. 4, whereby the other housing is shown open and without housing cover.
Figure 6:
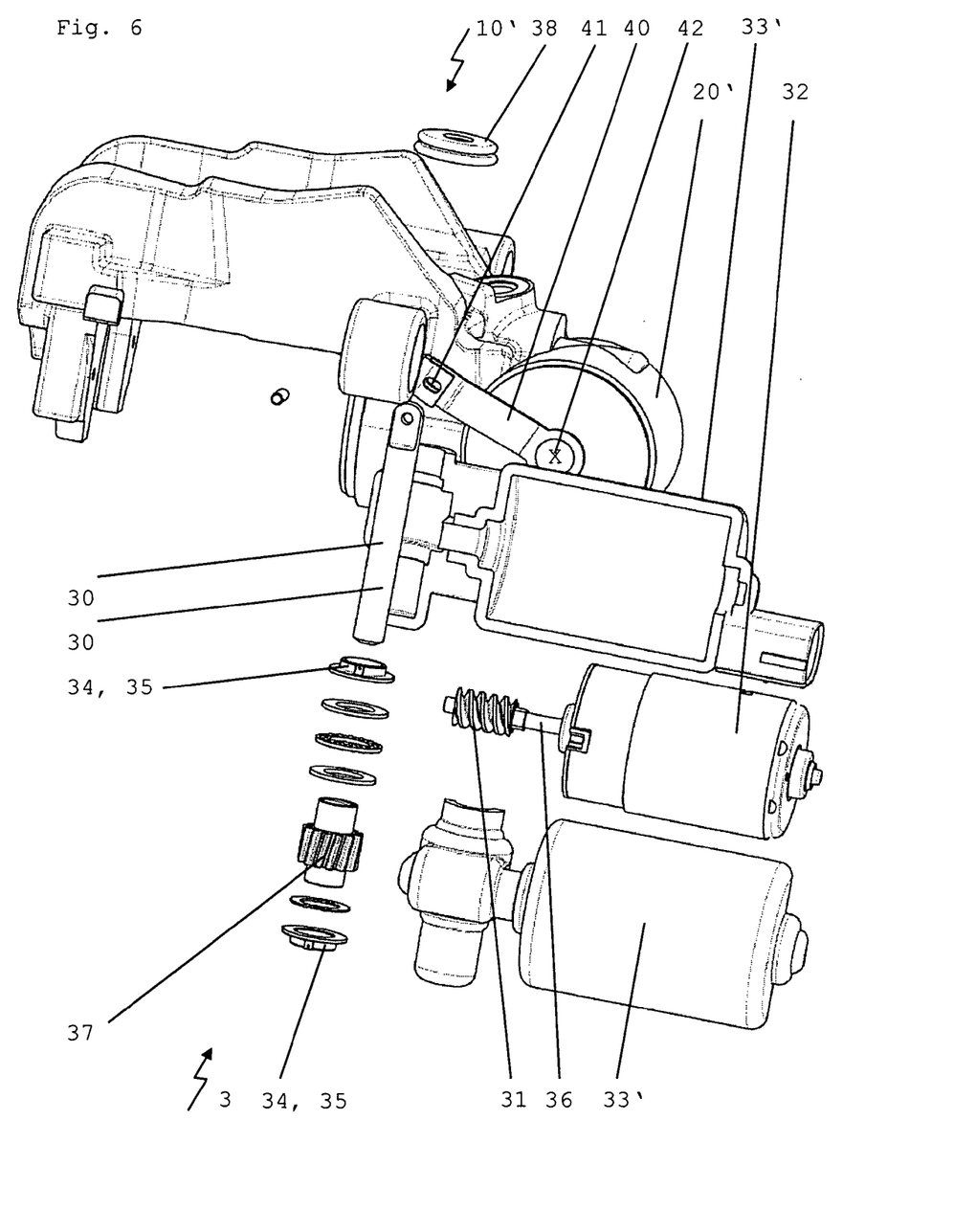
FIG. 6 shows a perspective view of the second brake caliper type with the actuation device and the drive from FIG. 4, whereby the worm-spindle transmission connected in analogy with FIG. 3 between the actuation device and the drive is shown in an exploded view.

FIGS. 4 to 6 shows second type of a brake caliper 10' with a housing 20'. However, now the housing 20' is aligned transversely to the brake piston axis A'. An appropriately attached actuation lever 40 can be constructed just as in the case of the first brake caliper of FIGS. 1-3. This lever also rotates in the current example of the second brake caliper 10' about the center of rotation 42 of the cup 20'. However, the center of rotation 42 is located at a different position since the cup 20' is pivotably arranged in comparison to the cup 20.

Figure 7:
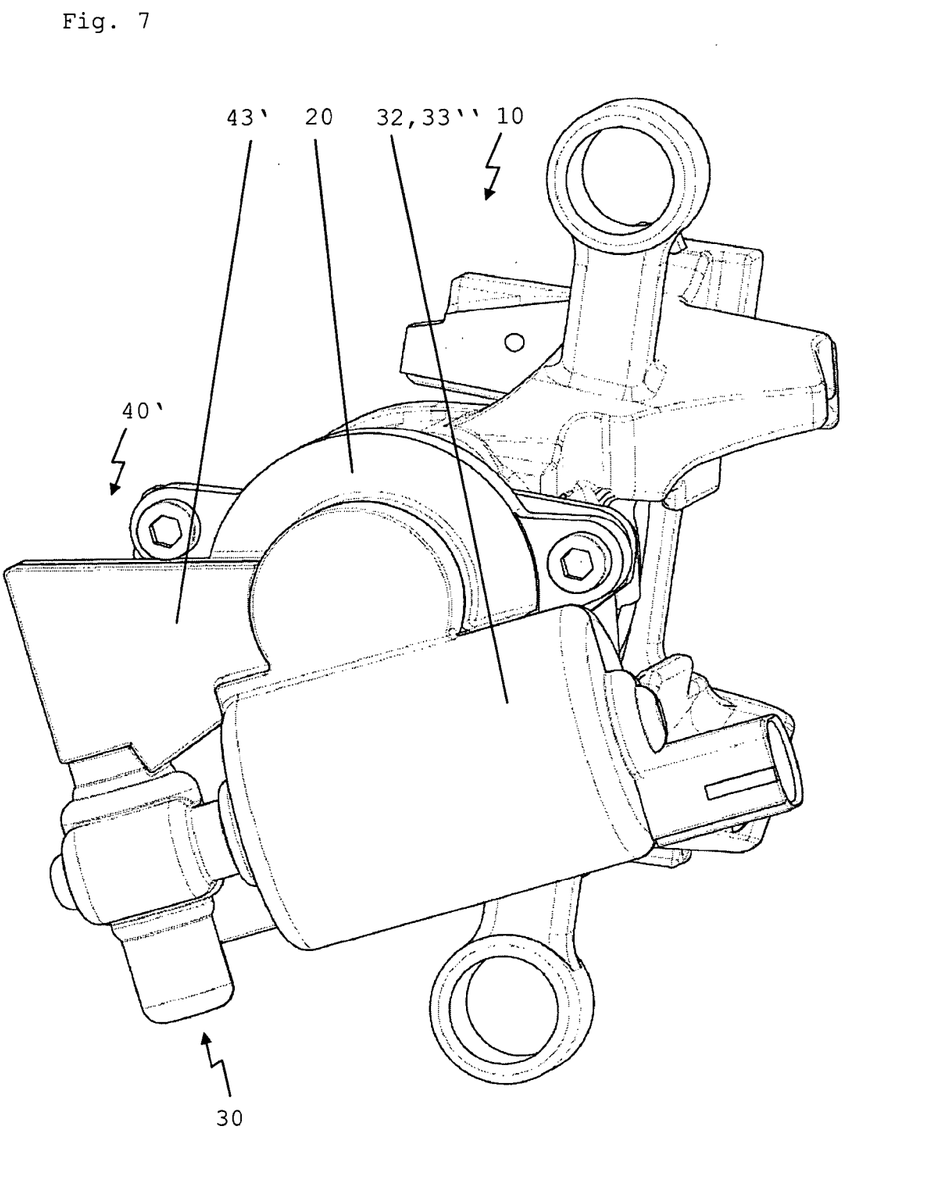
FIG. 7 shows a perspective view of the first brake caliper type with another actuation device closed by a housing and with a drive that is also closed and is in accordance with a second exemplary embodiment.
Figure 8:
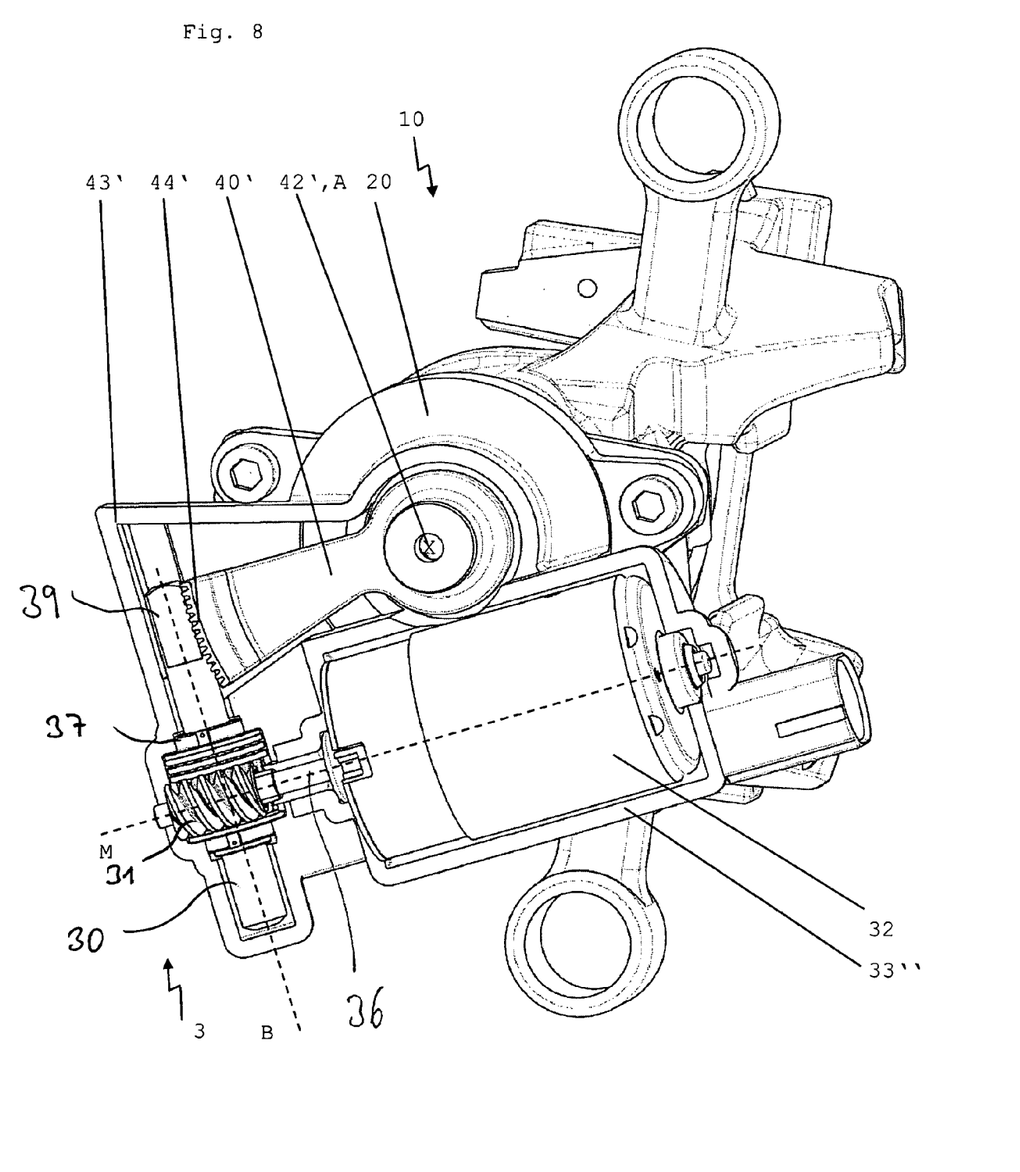
FIG. 8 shows a perspective view of the first brake caliper type with the actuation device and the drive from FIG. 7, whereby the housing is shown open and without housing cover.
Figure 9:
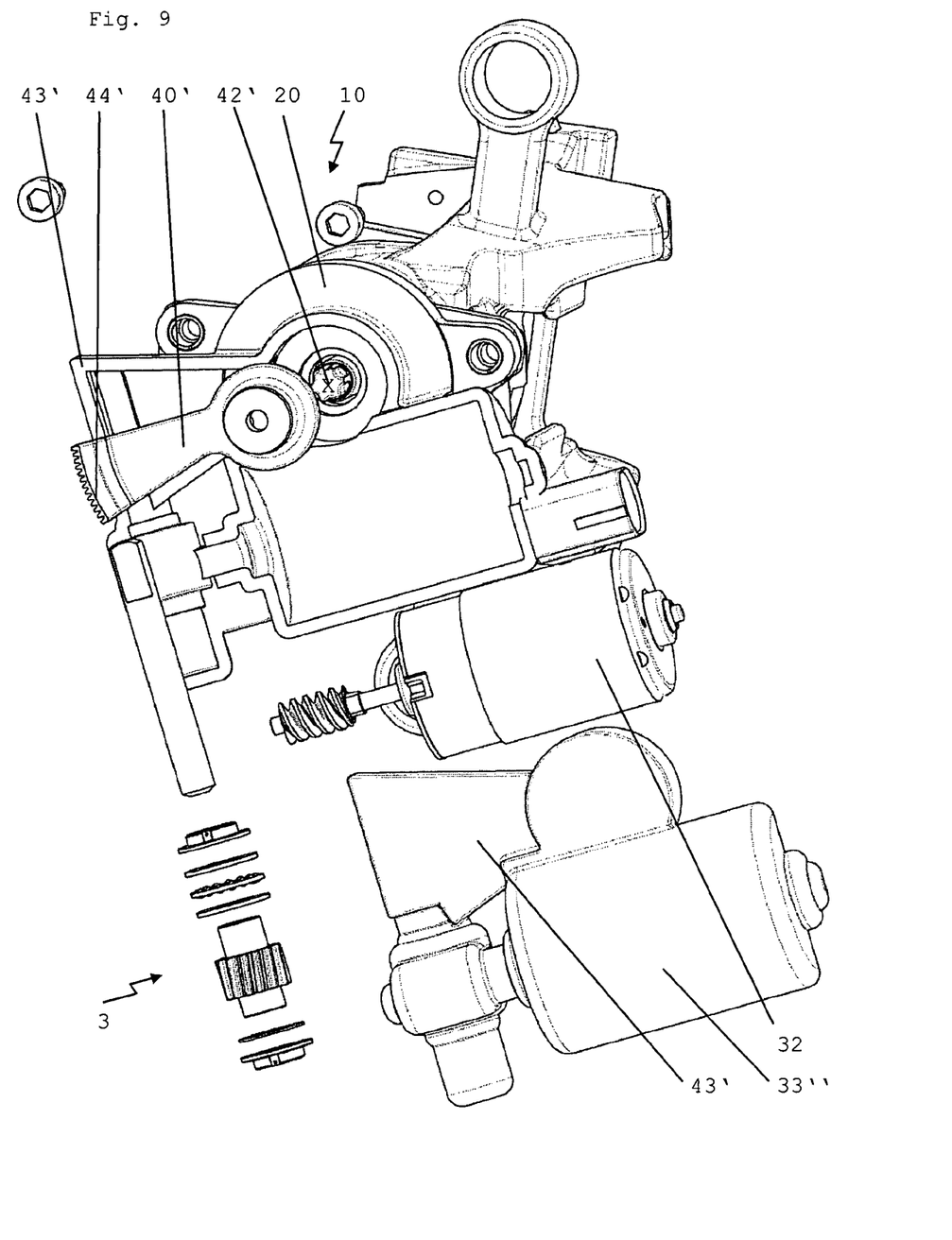
FIG. 9 shows a perspective view of the first brake caliper type with the actuation device and the drive from FIG. 7, whereby the worm-spindle transmission connected in analogy with FIG. 3 between the actuation device and the drive is shown in an exploded view.

The actuation lever 40, 40' is shown in two exemplary embodiments. The FIGS. 1 to 6 shows the first exemplary embodiment, in which the actuation lever 40 has an oblong hole 41. The FIGS. 7 to 9 show the second exemplary embodiment whose actuation lever 40' has a toothed segment 44' instead of the oblong hole 41. The same reference numbers are generally used for the same parts in the figures. For the sake of better clarity not all reference numbers are entered in all figures.

Figure 1:
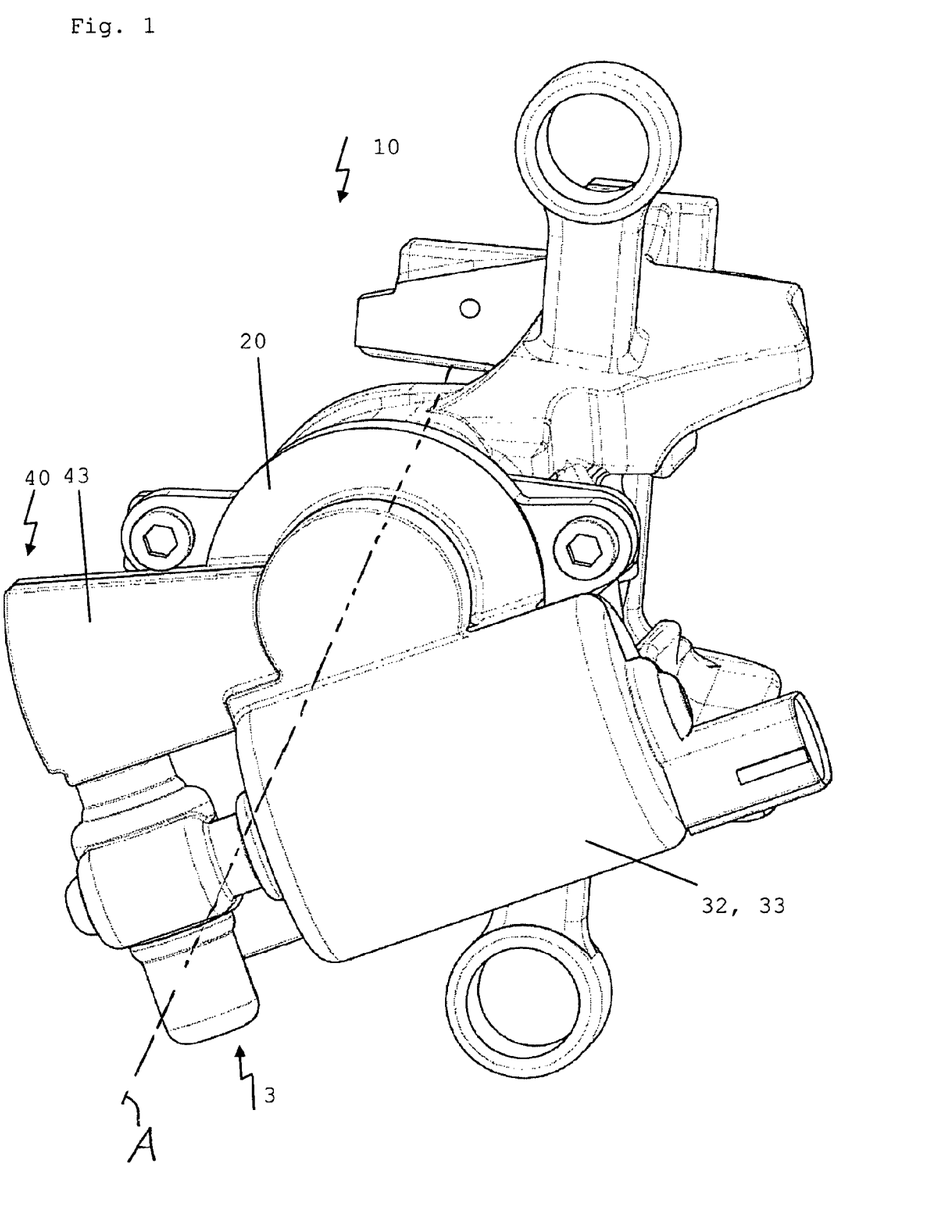
FIG. 1 shows a perspective view of a first brake caliper type with an actuation device closed by a housing and with a drive, that is also closed, in accordance with a first exemplary embodiment.

FIG. 1 shows a brake caliper 10 in accordance with the first type. The driver of a vehicle actuates a traditional parking brake in the brake caliper 10 by pulling on a brake lever. This linear force is transferred in the case of the brake caliper 10 customarily by a Bowden wire by the brake lever onto the lever arm of the actuation lever 40. The actuation lever 40 rotates as a consequence about an axis of rotation aligned vertically to the lever arm of the actuation lever 40. The rotary motion of the actuation lever 40 is converted in the brake caliper 10 into a linear motion of a brake piston 11. In the brake caliper 10 the brake piston 11 presses at least one brake shoe against a brake disk that rotates with a wheel of a vehicle when actuated by the actuation lever 40.

The traction on the brake lever and the transfer of force by the Bowden wire, which is also not shown, are replaced in a drive in accordance with the invention, as it is shown in FIG. 1, by an electromotor 32 and a transmission coupled to it, especially a worm-spindle transmission 3. The electromotor 32 is accordingly coupled via the worm-spindle transmission 3 to the actuation lever 40. A common housing 33, 43 covers the electromotor 32, the worm-spindle transmission 3 and the actuation lever 40. A separate motor housing 33' in accordance with FIG. 4 can also be used instead. Also, the housing 43 could be separately designed as a lever housing. A deviating form of the housing in the area of the actuation lever 40' is represented by the lever housing 43' in the FIGS. 7 to 9.

Figure 2:
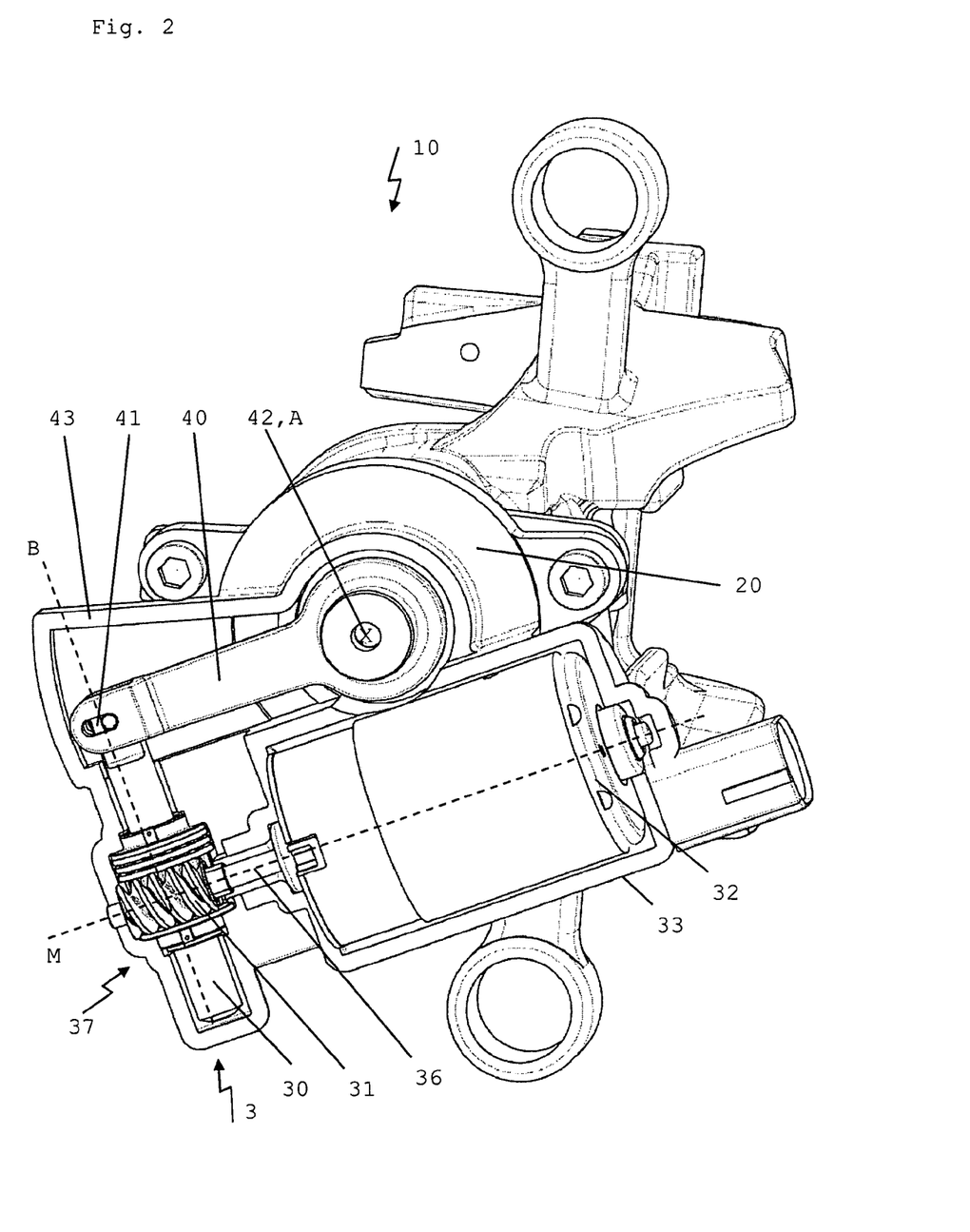
FIG. 2 shows a perspective view of the first brake caliper type with the actuation device and the drive from FIG. 1, whereby the housing is shown open and without a housing cover.

The FIGS. 2, 5 and 8 allow views into the interior of the particular housing 33, 33', 33", 43, 43'. By way of supplementation the worm-spindle transmission 3, that is constructed in a similar manner in all views, is shown in the exploded views of FIGS. 3, 6 and 9 with its components worm 31, spindle nut 37 and spindle 30 named along the flow of force and of moment. The worm 31 rotates with a motor shaft M of the electromotor 32 and is fastened in addition on its output shaft 36 in such a manner that it rotates in unison with it. The output shaft 36 can also be constructed distally directly as a worm. The worm 31 drives the spindle nut 37 so that the latter rotates about a spindle axis B that can be aligned at any angle to the motor shaft M.

The spindle nut 37 is supported axially and radially in a stationary manner. In addition, butting disks or butting sleeves assume the function of an axial support 34 and/or radial support 35. These functions can of course also be distributed onto several parts. Other disks 38 can be provided, for example, for the compensation of play or for the further support and improvement of the efficiency of the spindle 30. Supported and driven in such a stationary but rotatable manner, the spindle nut 37 drives the spindle 30 along the spindle axis B through its inside. To this end the spindle nut 37 has a thread on the inside that cooperates with the spindle 30.

The electromotor 32 for driving the worm-spindle transmission 3 is fastened according to the FIGS. 1 to 3 with its housing 33 on the outside via the transmission housing on the brake caliper 10. Its output shaft 36 exits along the motor axis M transversely to the brake piston axis A of the brake piston 10.

The spindle 30 is coupled to the actuation lever 40. It is pivotably received to this end in the oblong hole 41 provided in the actuation lever 40. If the spindle nut 37 is rotated, it shifts the spindle 30 along the spindle axis B and presses against the lever arm of the actuation lever 40 so that the actuation lever 40 rotates about its center of rotation 42.

The center of rotation 42 advantageously rests in the exemplary embodiments shown on the motor axis M. It can also rest somewhere else. According to the FIGS. 1 to 9 the corresponding axis or rotation stands vertically on the lever arm of the actuation lever 40, 40' and also vertically on the motor axis M.

The oblong hole 41 is aligned with its longitudinal axis onto the center of rotation 42. Consequently, a receptacle of the necessarily pivotably spindle 30 in the longitudinal hole 41 can move in they oblong hole 41 toward the center of rotation 42 when the brake is applied. For this, the driver does not pull on a brake lever as usual. Instead of this, for example, pressing a button for supplying the electromotor with current is sufficient.

The receptacle of the spindle 30 moves in the oblong hole 41 away from the center of rotation 42 when the brake is loosened. Of course, the system also functions exactly in the inverse manner.

The customary Bowden wire 20 is—as previously described—replaced by the electromotor drive with a transmission unit that attacks the activation lever 40, 40'. Alternatively, if a Bowden wire is to be retained, an attack by the spindle 30 or the transmission unit on the Bowden wire or the activation lever 40, 40' can additionally take place.

FIGS. 7 to 9 show an alternative coupling of the spindle 30 to the activation lever 40'. The spindle nut 37 rests positively in this example on the spindle 30. The spindle nut 37 is put in rotation by the drive worm 31 of the motor 32 so that the spindle 30 moves into the one or the other longitudinal direction as a function of the direction of rotation. The spindle 30 moved longitudinally by the motor 32 meshes on its upper end, that is shown in FIG. 8 and is constructed as a toothed rack 39, with the arched toothed segment 44', that is preferably formed in one piece on the actuation lever 40'. For this, the actuation lever 40' has a toothed segment 44' constructed in an arched shape—convex relative to the center of rotation 42—facing away from its center of rotation 42'. The toothed segment 44' rolls off over the rise of the spindle 30 with the spindle 30 constructed on its end as a straight or obliquely toothed rack 39. In the latter case of the oblique toothing the rise of the spindle 30 can be utilized, which makes a separately attached oblique toothing no longer necessary. The actuation lever 40' is rotated about its center of rotation 42 by the previously described embodiment. Such an actuation lever 40' could of course also be selected in a drive in accordance with the invention for the second brake caliper type 10'.

Figure 10:
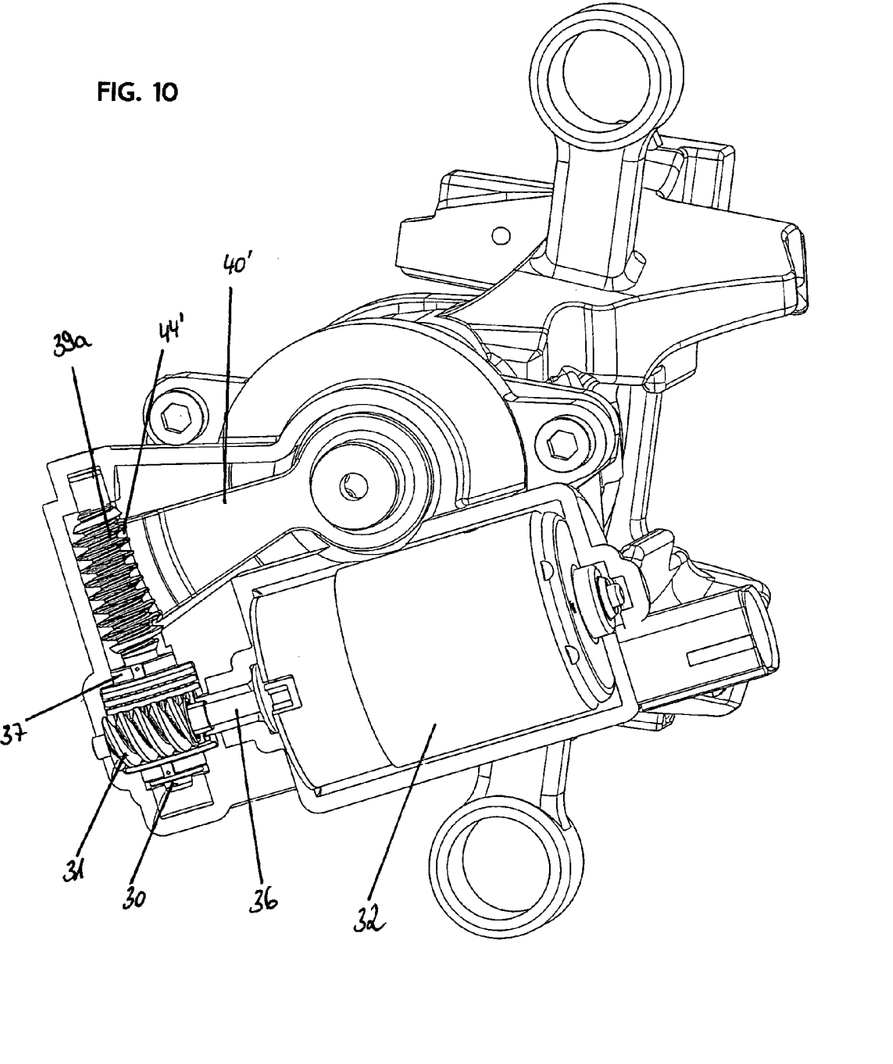
FIG. 10 shows another example of a drive in accordance with the invention.

Another mechanical coupling of the spindle 30 to the actuation lever 40' consists of a rotating spindle 30 with a spindle nut. The exemplary embodiment of FIG. 10 differs from the FIGS. 7 to 9 in that instead of a toothed rack 39 on the end of the spindle 30 a worm is provided that positively rotates with the spindle 30.

Figure 11:
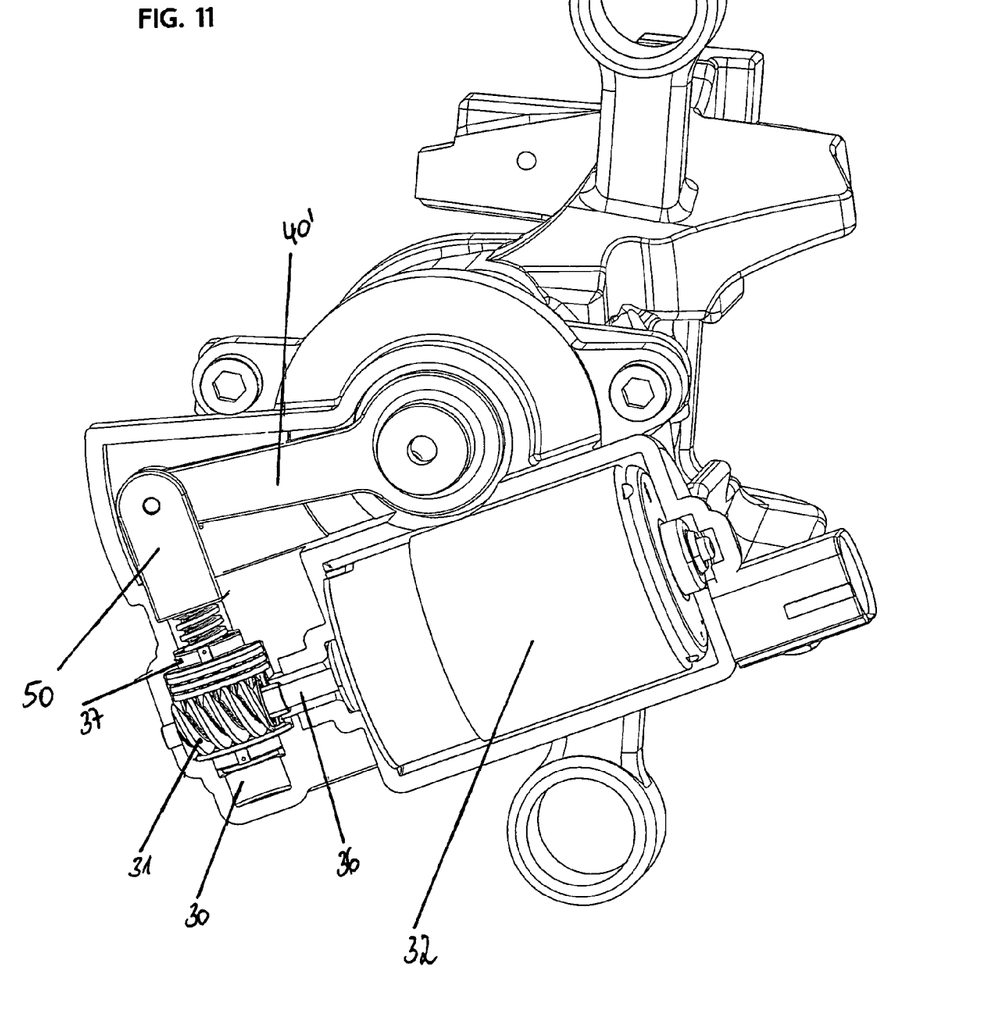
FIG. 11 shows still another example of a drive in accordance with the invention.

Yet another mechanical coupling of the output shaft 36 of the motor 32 to the actuation lever 40' consists in the embodiment described in FIG. 11. There, the end of the actuation lever 40' is connected in an articulated manner to a holding element 50. The upper end of the spindle 30 is screwed into this holding element 50. The spindle 30 is again able to move in rotation but otherwise, however, is arranged in a fixed manner and thus cannot move longitudinally. To this end the spindle nut 37 rests on the spindle 30 in such a manner that it can rotate in unison with it in an already known manner. The spindle nut 37 meshes with the worm 31 so that during the driving of the electromotor 32 the spindle 30 rotates to the left or to the right as a function of the direction of rotation of the output shaft 36. During the one direction of rotation of the spindle 30 the holding element 50 is screwed further onto the spindle 30 and as a consequence the actuation lever 40' is drawn downward. If the spindle 30 moves in the opposite direction the holding element 50 is lifted off further and further from the spindle 30 so that the actuation lever 40' is pivoted upward.

A drive in accordance with the invention is suitable for being jointly assembled with in particular purely mechanical brake calipers. In addition, a use of such drives for retrofitting existing brake systems in motor vehicles is possible.

LIST OF REFERENCE NUMERALS 3 worm-spindle transmission
10, 10' brake calipers
11, 11' brake piston
20, 20' housing
30 spindle
31 worm
32 electromotor
33, 33', 33" motor housing
34 axial support
35 radial support
36 output shaft
37 spindle nut
38 disk
39 toothed rack
39a worm
40, 40' actuation lever
41 oblong hole 42, 42' center of rotation
43, 43' lever housing
44' toothed segment
50 holding element
A, A' brake piston axis
B, B' spindle axis
M, M' motor axis In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that the invention is not limited to those precise embodiments, and that various changes, modifications, and adaptations may be effected therein by one skilled in the art without departing from the scope or spirit of the invention as defined in the appended

The invention claimed is:

1. A drive, for actuating a parking brake in a brake caliper, said drive comprising:
at least one brake caliper, further comprising:
at least one brake piston operable along a brake piston axis positioned on an actuation side; and
an electromotor having an output shaft providing motive rotational force fixably secured with said brake caliper;
said brake piston operably engaging an actuation lever having a respective center of rotation;
said output shaft being operably coupled to said actuation lever, whereby operating said actuation lever operates said brake piston;
said actuation lever operating said brake piston;
said electromotor comprising a worm element on said output shaft;
said worm element operably coupled to said brake piston during a use thereof;
said output shaft and said worm element rotating cooperatively during a use of said drive along a worm-spindle transmission;
said worm-spindle transmission having a spindle; and
said spindle operably coupled to said actuation lever during said use.

2. The drive, according to claim 1, wherein:
said spindle is aligned along a spindle axis; and
said spindle axis arranged opposing said motor axis.

3. The drive, according to claim 2, further comprising:
a toothed segment on a distal end of said actuation lever.

4. The drive, according to claim 3, wherein:
said toothed segment is arrayed facing away from said center of rotation of said actuation lever; and
said toothed segment is arrayed convexly away from said center of rotation.

5. The drive, according to claim 4, wherein:
said toothed segment operatively cooperates with said spindle; and
said toothed segment operatively cooperates with said spindle through at least one of a toothed rack and a worm element.

6. The drive, according to claim 2, further comprising:
an oblong hole defined on a distal end of said actuation lever;
said oblong hole extending along a direction toward an operable center of rotation of said actuation lever; and
said spindle operably engaging said oblong hole in a pivotable manner, whereby during said use said actuation lever is pivotable about said center of rotation.

7. The drive, according to claim 2, wherein:
said actuation lever operably engages with a spindle nut;
said spindle nut operably interengaging said spindle in such a manner allowing said spindle nut to rotate un unison with said rotation spindle; and
said spindle driven by said electromotor.

8. The drive, according to claim 1, further comprising:
a motor axis along said output shaft; and
said motor axis being aligned transversely to said brake piston axis.

9. The drive, according to claim 8, wherein:
said motor axis is aligned at one of perpendicular to said brake piston axis and parallel with said brake piston axis.

10. The drive, according to claim 1, wherein:
said electromotor is fixably secured on an outside of said brake caliper.

11. The drive, according to claim 1, wherein:
said output shaft of electromotor is arranged substantially perpendicular to said spindle.

12. A drive, for actuating a parking brake in a brake caliper, said drive comprising:
at least one brake caliper, further comprising:
at least one brake piston operable along a brake piston axis positioned on an actuation side;
an electromotor having an output shaft providing motive rotational force fixably secured with said brake caliper; and
an oblong hole defined on a distal end of said actuation lever;
said brake piston operably engaging an actuation lever having a respective center of rotation;
said output shaft being operably coupled to said actuation lever, whereby operating said actuation lever operates said brake piston;
said electromotor further comprising a worm element on said output shaft;
said worm element operably coupled to said brake piston during a use thereof;
said output shaft and said worm element cooperatively rotatable during a use of said drive along a worm-spindle transmission;
said worm-spindle transmission having a spindle;
said spindle being aligned along said a spindle axis and operably coupled to said actuation lever during said use;
said spindle axis being arranged opposing said motor axis;
said oblong hole extending along a direction toward an operable center of rotation of said actuation lever; and
said spindle operably engaging said oblong hole in a pivotable manner, whereby during said use said actuation lever is pivotable about said center of rotation.

13. The drive, according to claim 12, further comprising:
a toothed segment on a distal end of said actuation lever.

14. The drive, according to claim 13, wherein:
said toothed segment is arrayed facing away from said center of rotation of said actuation lever; and
said toothed segment is arrayed convexly away from said center of rotation.

15. The drive, according to claim 14, wherein:
said toothed segment operatively cooperates with said spindle; and
said toothed segment operatively cooperates with said spindle through at least one of a toothed rack and a worm element.

16. The drive, according to claim 12, further comprising:
a motor axis along said output shaft; and
said motor axis being aligned transversely to said brake piston axis.

17. The drive, according to claim 16, wherein:
said motor axis is aligned at one of perpendicular to said brake piston axis and parallel with said brake piston axis.

18. The drive, according to claim 12, wherein:
said electromotor is fixably secured on an outside of said brake caliper.

19. The drive, according to claim 12, wherein:
said exiting output shaft of electromotor is arranged facing said brake position.

20. The drive, according to claim 12, wherein:
said center of rotation of said actuation lever lies on said motor axis.

21. The drive, according to claim 12, wherein:
said actuation lever operably engages with a spindle nut;
said spindle nut operably interengaging said spindle in such a manner allowing said spindle nut to rotate un unison with said rotation spindle; and
said spindle driven by said electromotor.

22. A drive, for actuating a parking brake in a brake caliper, said drive comprising:
at least one brake caliper, further comprising:
at least one brake piston operable along a brake piston axis positioned on an actuation side;
an electromotor having an output shaft providing motive rotational force fixably secured with said brake caliper; and
a motor axis along said output shaft and aligned transversely to said brake piston axis;
said brake piston operably engaging an actuation lever having a respective center of rotation;
said center of rotation of said actuation lever lies on said motor axis;
said output shaft being operably coupled to said actuation lever, whereby operating said actuation lever operates said brake piston;
said output shaft and a drive-worm rotate cooperatively during a use of said drive along a worm-spindle transmission;
said worm-spindle transmission having a spindle;
said spindle aligned along said a spindle axis and operably coupled to said actuation lever during said use; and
said spindle axis arranged opposing said motor axis.

23. The drive, according to claim 22, further comprising:
a toothed segment on a distal end of said actuation lever.

24. The drive, according to claim 23, wherein:
said toothed segment is arrayed facing away from said center of rotation of said actuation lever; and
said toothed segment is arrayed convexly away from said center of rotation.

25. The drive, according to claim 23, wherein:
said toothed segment operatively cooperates with said spindle; and
said toothed segment operatively cooperates with said spindle through at least one of a toothed rack and a worm element.

26. The drive, according to claim 22, further comprising:
an oblong hole defined on a distal end of said actuation lever;
said oblong hole extending along a direction toward an operable center of rotation of said actuation lever; and
said spindle operably engaging said oblong hole in a pivotable manner, whereby during said use said actuation lever is pivotable about said center of rotation.

27. A drive, for actuating a parking brake in a brake caliper, said drive comprising:
at least one brake caliper, further comprising:
at least one brake piston operable along a brake piston axis positioned on an actuation side;
an electromotor having an output shaft providing motive rotational force fixably secured with said brake caliper;
a motor axis along said output shaft and aligned transversly to said brake piston axis; and
an oblong hole defined on a distal end of said actuation lever;
said brake piston operably engaging an actuation lever having a respective center of rotation;
said center of rotation of said actuation lever lies on said motor axis;
said output shaft being operably coupled to said actuation lever, whereby operating said actuation lever operates said brake piston;
said output shaft and a drive worm cooperatively rotatable during a use of said drive along a worm-spindle transmission;
said worm-spindle transmission having a spindle;
said spindle being aligned along said a spindle axis and operably coupled to said actuation lever during said use;
said spindle axis being arranged opposing said motor axis;
said oblong hole extending along a direction toward an operable center of rotation of said actuation lever; and
said spindle operably engaging said oblong hole in a pivotable manner, whereby during said use said actuation lever is pivotable about said center of rotation.

28. The drive, according to claim 27, further comprising:
a toothed segment on a distal end of said actuation lever.

29. The drive, according to claim 28, wherein:
said toothed segment is arrayed facing away from said center of rotation of said actuation lever; and
said toothed segment is arrayed convexly away from said center of rotation.

30. The drive, according to claim 28, wherein:
said toothed segment operatively cooperates with said spindle; and
said toothed segment operatively cooperates with said spindle through at least one of a toothed rack and a worm element.

* * * * *